United States Patent
Iwasaki (10) Patent No.: US 8,025,128 B2
(45) Date of Patent: Sep. 27, 2011

(54) BALL SCREW LUBRICATIVE SEALING DEVICE

(75) Inventor: Yoshimi Iwasaki, Futtsu (JP)

(73) Assignee: Kuroda Precision Industries Ltd., Kawasaki-shi (JP)

( * ) Notice: Subject to any disclaimer, the term of this patent is extended or adjusted under 35 U.S.C. 154(b) by 0 days.

(21) Appl. No.: 12/804,865

(22) Filed: Jul. 30, 2010

(65) Prior Publication Data

US 2010/0295249 A1   Nov. 25, 2010

Related U.S. Application Data

(62) Division of application No. 11/254,471, filed on Oct. 20, 2005, now Pat. No. 7,857,100.

(30) Foreign Application Priority Data

Oct. 21, 2004   (JP) .................. 2004-306994

(51) Int. Cl.
*F16N 1/00* (2006.01)
*F16H 3/06* (2006.01)

(52) U.S. Cl. .......................... 184/5; 74/89.44

(58) Field of Classification Search ........ 184/5; 384/13, 384/15; 470/2, 5, 6, 48–52; 277/342, 500, 277/549, 551, 556, 562, 563, 568, 637; 74/89.4, 74/89.44, 424.71, 467; 411/432, 433
See application file for complete search history.

(56) References Cited

U.S. PATENT DOCUMENTS

| | | | |
|---|---|---|---|
| 1,607,873 A | 11/1926 | Crowder | |
| 4,053,167 A | 10/1977 | Jelinek | |
| 4,755,115 A | 7/1988 | Akaike | |
| 5,704,719 A | 1/1998 | Cook et al. | |
| 5,749,266 A | 5/1998 | Tsukada | |
| 6,190,046 B1 | 2/2001 | Agari | |
| 6,216,821 B1 | 4/2001 | Namimatsu et al. | |
| 6,450,295 B1 | 9/2002 | Tsukada et al. | |
| 6,619,148 B2 | 9/2003 | Nishide | |
| 6,634,246 B2 | 10/2003 | Ohya et al. | |
| 6,931,955 B2 * | 8/2005 | Yatsushiro et al. | ............ 74/89.4 |
| 7,033,294 B2 | 4/2006 | Chamberlain et al. | |
| 7,278,333 B2 | 10/2007 | Kato et al. | |
| 7,430,933 B2 | 10/2008 | Yatsushiro et al. | |

(Continued)

FOREIGN PATENT DOCUMENTS

JP   5-43310   11/1993

(Continued)

*Primary Examiner* — Bradley King
*Assistant Examiner* — Thomas Irvin
(74) *Attorney, Agent, or Firm* — Oliff & Berridge, PLC (57) ABSTRACT

The invention provides a ball screw lubricative sealing device having a simplified lubrication mechanism. It is attachable to an installed standard ball screw nut, capable of retaining larger amount of lubricant and long supply of lubricant to the contacting screw parts, and further includes a sealing function. It includes: generally cylindrical case members having attachment part to be attached to both ends of a screw nut, respectively; plural thin seal plates made of lubricating oil impregnated felt-like fiber material which is a three-dimensionally crosslinked plastic fiber and resilient rubber members, and having a hole each and fitted inside said case member in such a state that they circumferentially overlap with each other, the hole having a shape corresponding to a lateral cross-sectional shape of a screw groove of ball screw shaft; and a plastic wiper fitted with a space from the thin seal plates inside each of the case member.

3 Claims, 5 Drawing Sheets

| U.S. PATENT DOCUMENTS | | | |
|---|---|---|---|
| 7,500,409 B2 | 3/2009 | Yatsushiro et al. | |
| 2002/0036384 A1 | 3/2002 | Nakagawa | |
| 2002/0144560 A1* | 10/2002 | Yatsushiro et al. | 74/89.4 |
| 2009/0038887 A1 | 2/2009 | Hwang et al. | |
| 2009/0229919 A1 | 9/2009 | McDonald et al. | |

| FOREIGN PATENT DOCUMENTS | | |
|---|---|---|
| JP | 10-002395 | 1/1998 |
| JP | 3288961 | 3/2002 |
| JP | 2002-147561 | 5/2002 |
| JP | 2005-155702 | 6/2005 |

* cited by examiner

BALL SCREW LUBRICATIVE SEALING DEVICE

CROSS-REFERENCE TO RELATED APPLICATIONS AND CLAIM FOR PRIORITY

This application is a divisional of application Ser. No. 11/254,471, filed Oct. 20, 2005, now issued as U.S. Pat. No. 7,857,100 on Dec. 28, 2010, entitled BALL SCREW LUBRICATIVE SEALING DEVICE, the priority of which is claimed herein, which application Ser. No. 11/254,471 was based upon and claimed the benefit of priority from Japanese Patent Application No. 2004-306994, filed on Oct. 21, 2004, the priority of which is also claimed in the present divisional application, and said application Ser. No. 11/254,471 having been based also upon Japanese Patent Application No. 2003-392279, filed on Nov. 21, 2003, the entire contents of which applications are incorporated herein by reference.

BACKGROUND OF THE INVENTION

1. Field of the Invention

The present invention relates to a lubricative sealing device which provides lubrication to rolling parts of ball screws, particularly between the screw groove of the ball screw shaft or the ball screw nut and the balls, and enables the ball screw to be used for a long time without replenishment of oil.

2. Description of the Related Art

Various sealing devices of this type have been proposed so far (see, for example, Japanese Unexamined Patent Application Publication No. 10-2395 and Japanese Patent No. 3288961).

Japanese Unexamined Patent Application Publication No. 10-2395 discloses a structure in which a lubricant-impregnated rubber or synthetic resin ring is attached to the end of a ball nut with a pressing member which has projections to apply a preload to the ring in a circumferential direction.

Japanese Patent No. 3288961 discloses a sealing device that is attached to sliding members such as nuts similarly to Japanese Unexamined Patent Application Publication No. 10-2395. The lubricating oil applying member is made of polyester/wool blend felt, sintered resin, or the like, which has the merit of being able to absorb and hold more lubricant, as described in the specification.

Another structure for the sealing device is known, as described in Japanese Examined Utility Model Application Publication No. 5-43310. In this sealing device, thin seal plates having holes of shapes that correspond to the lateral cross-sectional shape of the screw groove of the ball screw shaft are circumferentially displaced and overlapped, and held in a frame-shaped ring to be attached to the end of the ball nut. This structure is effective as a sealing device.

A sealing device that can be used on any installed standard ball screw nuts by attaching to both ends of the ball screw nut is also known (see, for example, Japanese Unexamined Patent Application Publication No. 2002-147561).

In the structure disclosed in Japanese Unexamined Patent Application Publication No. 10-2395, however, pressure is constantly applied to the lubricant supplying member making contact with the balls serving as rolling elements, to keep their contact for a long time. This accordingly causes a problem of complexing lubrication mechanism.

With the structure of Japanese Patent No. 3288961, while the member that makes contact with the rolling elements, or balls, to apply oil can absorb and hold a large amount of oil, it requires a lubricating oil reservoir member (tank function) that supply oil in order to achieve constant lubricating effect.

Another problem is that the lubricating oil applying and retaining member loses its resiliency in the areas contacting the balls as time passes, which leads to its plastic deformation, and as the surfaces contacting the rolling balls deteriorate, the lubricating effect may be reduced. Also, since felt materials usually have large pores, absorbed oil can readily flow out. Therefore, the structure needs to be modified such as provision of a flow rate control valve between the oil reservoir member and the oil application member, as described in the specification.

Further, the device shown in Japanese Examined Utility Model Application Publication No. 5-43310 uses a common seal material, and therefore, while it has good sealing properties, it lacks a lubricating function and is unable to supply lubricating oil stably for a long time.

Furthermore, with the device shown in Japanese Unexamined Patent Application Publication No. 2002-147561, the built-in lubricant holding member is made of a porous sintered resin material. Therefore, similar to the other conventional devices described above, the lubricating oil applying and retaining member loses its resiliency as time passes in the areas contacting the balls, which leads to its plastic deformation, and as the surfaces contacting the rolling balls deteriorate, the lubricating effect can be reduced. Accordingly, the device shown in this fourth patent document requires an oil replenishing member attached to one side, which is provided in addition to the lubricant applying member that contacts the screw groove, so that lubricant is replenished constantly from outside to the rolling parts of the screw.

SUMMARY OF THE INVENTION

The present invention has been made to solve these problems in the conventional techniques. The object is thereof to eliminate the complexity of the lubrication mechanism and provide a ball screw lubricative sealing device which is externally attachable to an installed standard ball screw nut. The ball screw lubricative sealing device is capable of retaining larger amount of lubricant and long supply of lubricating oil to the contacting screw parts, and it further includes a sealing function.

Another object of the present invention is to provide a ball screw lubricative sealing device which can be attached externally to the side face of a standard ball screw.

Yet another object of the present invention is to provide a ball screw lubricative sealing device which can be attached externally to the side face of a standard ball screw without any additional work.

A lubricative sealing device according to a first aspect of the invention includes generally cylindrical case members having attachment parts to be attached to both ends of a screw nut, respectively, a plurality of thin seal plates having a hole each and fitted inside each of the case members in such a state that they are circumferentially displaced and overlap with each other, the hole having a shape corresponding to a lateral cross-sectional shape of a screw groove of a ball screw shaft, and a plastic wiper fitted with a space from the this seal plates inside each of the case members, in which the plurality of thin seal plates are made of a lubricating oil impregnated felt-like material formed of a fiber material which is made of a three-dimensionally crosslinked plastic fiber and resilient rubber members.

In the first aspect of the invention, preferably, outer circumferential surfaces of the plurality of thin seal plates circumferentially displaced are fixed to an inner circumferential surface of each of the case members using an adhesive. Preferably, the plurality of thin seal plates are impregnated with lubricating oil after they are inserted and fixed inside each of the case members in circumferentially displaced manner.

With the first aspect of the invention, because the resilient force of the resilient rubber member exerts on the screw groove surface, the thin seal plates can provide long lubricating effect as compared to other common felt materials. Moreover, unlike the conventional devices, they can achieve effective lubrication without a mechanism such as applying pressure from an outer circumference side.

Since only the outer circumferential surface of the thin seal plates are bonded and fixed to the inner circumferential surface of each of the case members, the thin seal plates can hold sufficient amount of lubricating oil. Besides, they can move freely to follow the screw grove inside the inner circumference, so that good seal performance and effective lubricating oil application are achieved.

Further, because the thin seal plates are formed of resilient rubber members, the felt material contained therein is less likely to peel off as compared to other common felt materials. Also, the thin seal plates are capable of catching contaminants from outside in their oil-holding spaces, thereby also providing a sealing function.

Further, since the plastic wiper is located outermost of each of the case members, and the lubricant supplying thin seal plates are located with a space from the plastic wiper, contaminants from outside are removed by the plastic wiper, and small contaminants that have entered are pushed through into the next space and kept there, or caught in the lubricant supplying thin seal plates. Thus, the entry of contaminants to the inside is prevented reliably.

A lubricative sealing device according to a second aspect of the invention includes: generally cylindrical case members to be attached to both ends of a screw nut of a ball screw, respectively, using fastening bolts; a thin cap inserted and fixed inside each of the case members, a plurality of thin seal plates placed inside the thin cap and made of a lubricating oil-impregnated felt-like material formed of a fiber material which is made of a three-dimensionally crosslinked plastic fiber and resilient rubber member, and a grease reservoir space formed inside each of the case members between the plurality of thin seal plates and one end of the screw nut.

With the second aspect of the invention, because the lubricant-impregnated seal members and the grease reservoir space are placed inside each of the case members, the lubricative sealing device can be used without replenishing oil for a long time, and thus enables maintenance-free use of the ball screw.

Moreover, because of the structure in which the thin seal plates are placed inside the thin cap, the lubricative sealing device can be assembled easily.

A lubricative sealing device according to a third aspect of the invention includes either one of end caps and end covers attached to both ends of a screw nut of a ball screw, respectively, using fastening bolts each having a head with a concentric screw thread formed therein, a generally cylindrical case member to be attached to either one of the end caps and the end covers, respectively, using mounting bolts engaging them with the a concentric screw threads formed in the heads of the fastening bolts, a thin cap inserted and fixed inside each of the case members, a plurality of thin seal plates fitted inside the thin cap and made of a lubricating oil impregnated felt-like material formed of a fiber material which is made of a three-dimensionally crosslinked plastic fiber and resilient rubber members, and a grease reservoir space formed inside each of the case members between the plurality of thin seal plates and one end of the screw nut.

In either one of the second aspect and third aspect of the invention, each of the fastening bolts is preferably a bolt having a head with a hexagonal hole. Also, each of the mounting bolts is preferably a bolt having a head with a hexagonal hole. Further, outer circumferential surfaces of the plurality of thin seal plates circumferentially overlapped are preferably fixed to an inner circumferential surface of each of the case members using an adhesive. Also, the plurality of thin seal plates are preferably impregnated with lubricating oil after they are inserted and fixed inside each of the case members in the circumferentially overlapping manner.

With the third aspect of the invention, because of the lubricant-impregnated seal members and the grease reservoir space inside each of the case members, the lubricative sealing device can be used without replenishing oil for a long time, and thus enables maintenance-free use of the ball screw.

With the third aspect of the invention, the lubricative sealing device can be attached to a ball screw nut only with a devisal to the mounting screw and without any additional work to the ball screw structure, whereby a cost reduction can be achieved.

The double screw structure of each of the fastening bolts that attaches the component such as the end cap or the end cover having a concentric screw hole, provides a side advantage that the case member of the lubricative sealing device is firmly attached by the mounting screw fitted in the concentric screw hole of the fastening bolt.

Also, with the use of the fastening bolt having the above-described double screw structure that attaches a component of a standard ball screw such as an end cover, it is made unnecessary to do additional work to the ball screw or disassemble the ball screw at the time of installing the lubricative sealing device. Therefore, ball screw accuracy and assembling accuracy of the ball circulation parts will not be lowered.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

Various embodiments of the present invention shown in the drawings will be hereinafter described.

First Embodiment

Figure 1:
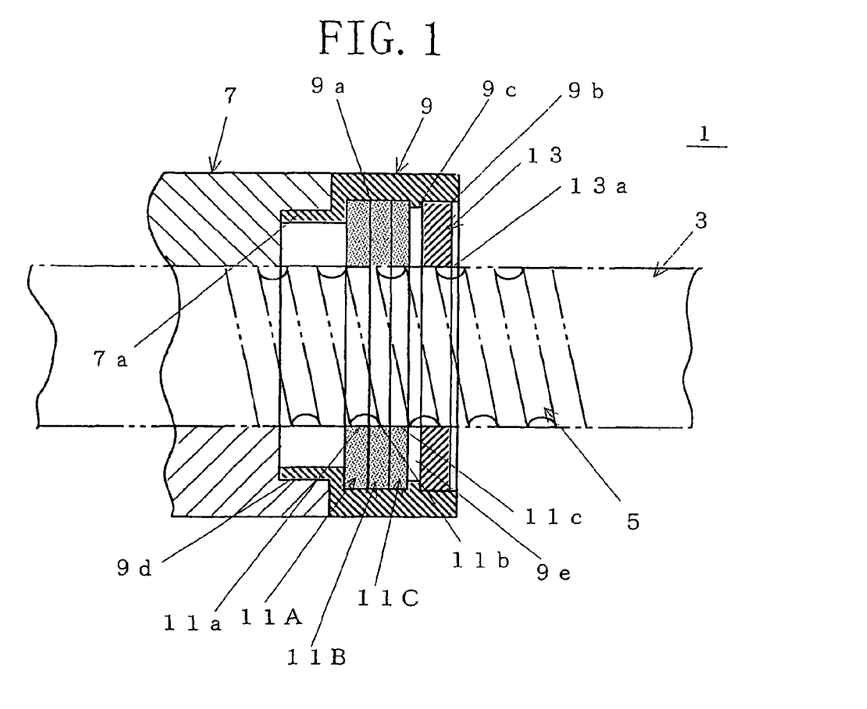
FIG. 1 is a cross-sectional view of a ball screw lubricative sealing device 1 according to the first embodiment of the present invention, which is assembled to one end of a ball screw nut.
Figure 2:
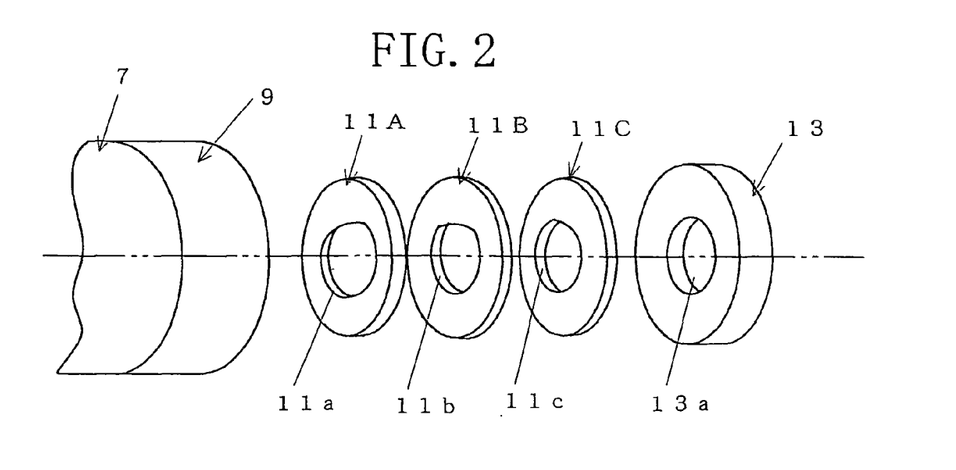
FIG. 2 is an exploded perspective view of the ball screw lubricative sealing device 1 according to the first embodiment of the present invention.
Figure 3:
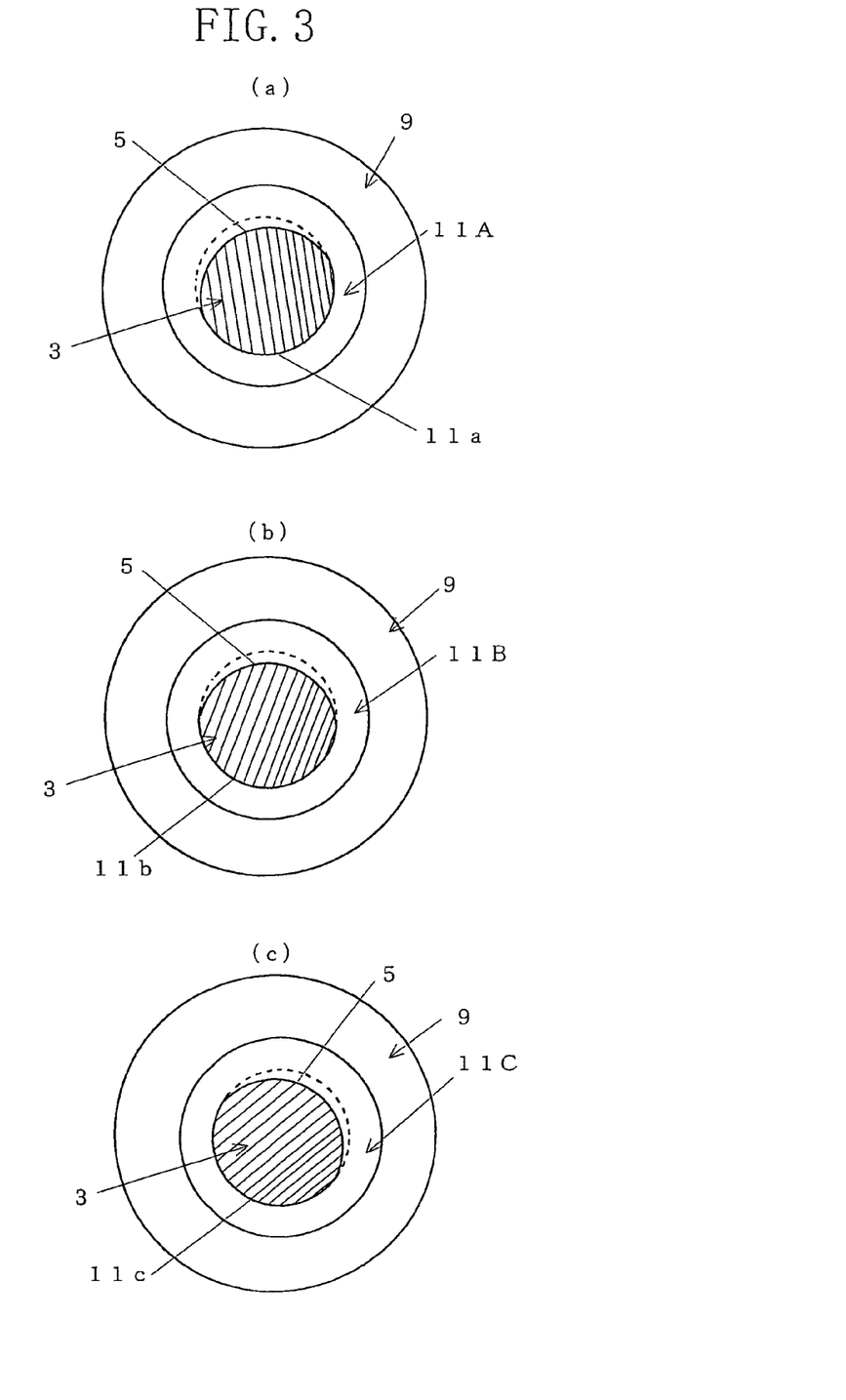
FIG. 3 is a cross-sectional view showing the relationship between each of thin seal plates 11A, 11B, and 11C and a ball screw shaft 3 in the ball screw lubricative sealing device 1 according to the first embodiment of the present invention.

FIG. 1 is a cross-sectional view of a ball screw lubricative sealing device 1 according to a first embodiment of the present invention which is assembled to one end of a ball screw nut, FIG. 2 is an exploded perspective view of the ball screw lubricative sealing device 1 according to the first embodiment of the present invention, and FIG. 3 is a cross-sectional view showing the relationship between each of thin seal plates 11A, 11B, and 11C and a ball screw shaft 3 in the ball screw lubricative sealing device 1 according to the first embodiment of the present invention.

The ball screw lubricative sealing device 1 according to this embodiment includes: generally cylindrical case members 9 having attachment parts 9d to be connected to both ends of a screw nut 7, respectively, which are threadably engaged with a ball screw shaft 3 having a helical groove 5, with rolling elements such as steel balls (not shown) interposed therebetween; three thin seal plates 11A, 11B, and 11C having holes 11a, 11b, and 11c that correspond to the lateral cross-sectional shape of the helical groove 5 of the screw shaft 3 and set in a groove 9a of each of the case members 9 in such a state that they are circumferentially displaced and overlapping with each other; and a plastic wiper 13 set inside each of the case members 9 that accommodates the three thin seal plates 11A, 11B, and 11C with a space 9e from the three thin seal plates 11A, 11B, and 11C. The outer circumferential surfaces of the three overlapped thin seal plates 11A, 11B, and 11C are fixed to the inner circumferential surface of each of the case members 9 using an adhesive. The three thin seal plates 11A, 11B, and 11C are made of a felt-like material impregnated with a lubricating oil, the felt-like material being formed of a fiber material which is made of a three-dimensionally crosslinked plastic fiber and resilient rubber members.

Each of the case members 9 is generally cylindrical and has the same size as the outer shape of either end of the screw nut 7. Each of the case members 9 has the attachment part 9d at one end, which is threadably engaged with a cavity 11a provided at either end of the screw nut 7. Inside each of the case members 9 there are the groove 9a for setting the three thin seal plates 11A, 11B, and 11C, an annular projection 9c for forming the space 9e, and a groove 9b for setting the plastic wiper 13 by screwing or bonding.

The fiber material made of three-dimensionally crosslinked plastic fiber and the resilient rubber members, which forms the three thin seal plates 11A, 11B, and 11C, is obtained by adhering molten rubber on the surfaces of thin polyester plastic fibers, in which the integrated fiber material has a multiplicity of spaces between the fibers. These spaces are filled with a lubricant such as grease to form a lubricant supply unit. Polyester resin is effectively used as the base resin of the plastic fiber, but the material is not limited to this.

Next, the mechanism of the thus structured embodiment of the ball screw lubricative sealing device 1 will be described.

Firstly, referring to FIG. 1 and FIG. 2, the three lubricant-impregnated thin seal plates 11A, 11B, and 11C are circumferentially displaced and overlapped in the groove 9a of the case member 9. After they are fixedly bonded in the groove 9a of the case member 9, the plastic wiper 13 is set in the outer groove 9b of the case member 9.

Next, the attachment part 9d of the case member 9 is threadably engaged with the cavity 11a at either end of the screw nut 7.

Next, the ball screw shaft 3 is inserted into the hole 13a of the plastic wiper 13 and the holes 11a, 11b, and 11c of the three thin seal plates 11A, 11B, and 11C.

Thereby, the holes 11a, 11b, and 11c of the three thin seal plates 11A, 11B, and 11C make contact with the screw groove 5 of the ball screw shaft 3, as shown in FIG. 3.

The holes 11a, 11b, and 11c of the three thin seal plates 11A, 11B, and 11C make pressure contact with the surface of the screw groove 5 of the ball screw shaft 3 because of the resiliency of the resilient rubber member, whereby the thin seal plates provide lubricating effect for a longer time as compared to known felt materials.

Further, the plastic wiper 13 located on the outer side of the case member 9 removes most of the contaminants from outside. Small contaminants that have passed through the plastic wiper 13 are trapped in the space 9e. Contaminants that proceed further inside are caught and kept in the interspaces between the fibers of the three thin seal plates 11A, 11B, and 11C. Entrance of contaminants from outside is thus prevented reliably.

As described above, with this embodiment of the ball screw lubricative sealing device 1, effective lubrication is achieved without any mechanism for applying pressure from an outer circumferential side as with the conventional device.

While the three thin seal plates 11A, 11B, and 11C used in the above-described embodiment are preliminarily impregnated with a lubricating oil, this is not a requirement of the present invention and the thin seal plates 11A, 11B, and 11C may be impregnated with a lubricating oil after they are fixedly set inside the case member 9.

Also, while three thin seal plates 11A, 11B, and 11C are used in the above-described embodiment, this is not a requirement of the present invention and the number of thin seal plates may be suitably selected according to needs.

Further, while the ball screw shaft 3 has a single-thread screw groove 5 in the above-described embodiment, this is not a requirement of the present invention and the screw shaft may have any number of threads.

Furthermore, while the case member 9 is attached to the screw nut 7 by threadably engaging the attachment part 9d with the cavity 11a at either end of the screw nut 7 in the above-described embodiment, this is not a requirement of the present invention and the case member may be attached by any other means.

Second Embodiment

FIG. 4 to FIG. 7 show a ball screw lubricative sealing device 20 according to a second embodiment of the present invention.

Figure 4:
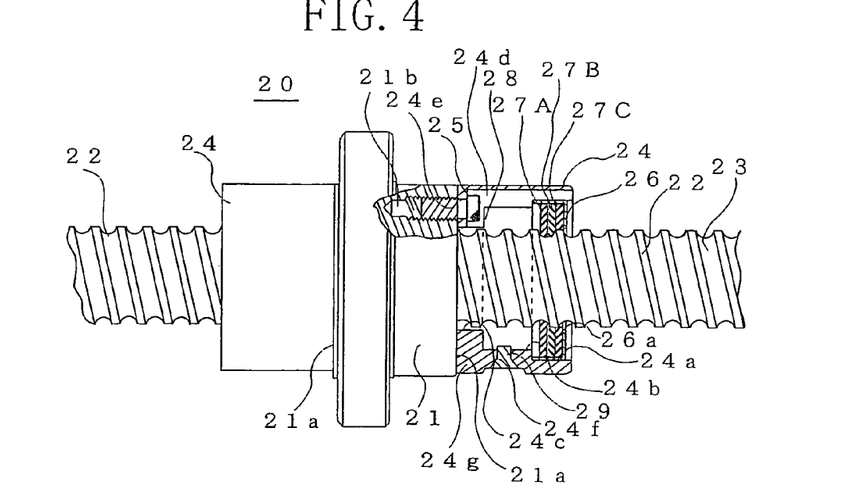
FIG. 4 is a partially cut-away side view of a ball screw lubricative sealing device according to the second embodiment of the present invention.
Figure 6:
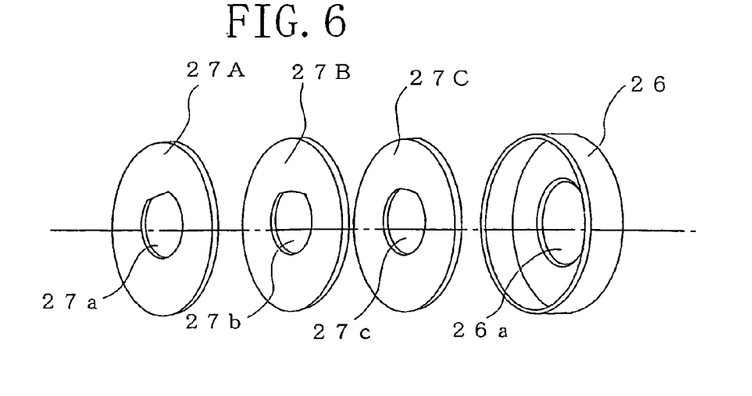
FIG. 6 is a perspective view showing how the lubricative sealing part of FIG. 4 is assembled.
Figure 7:
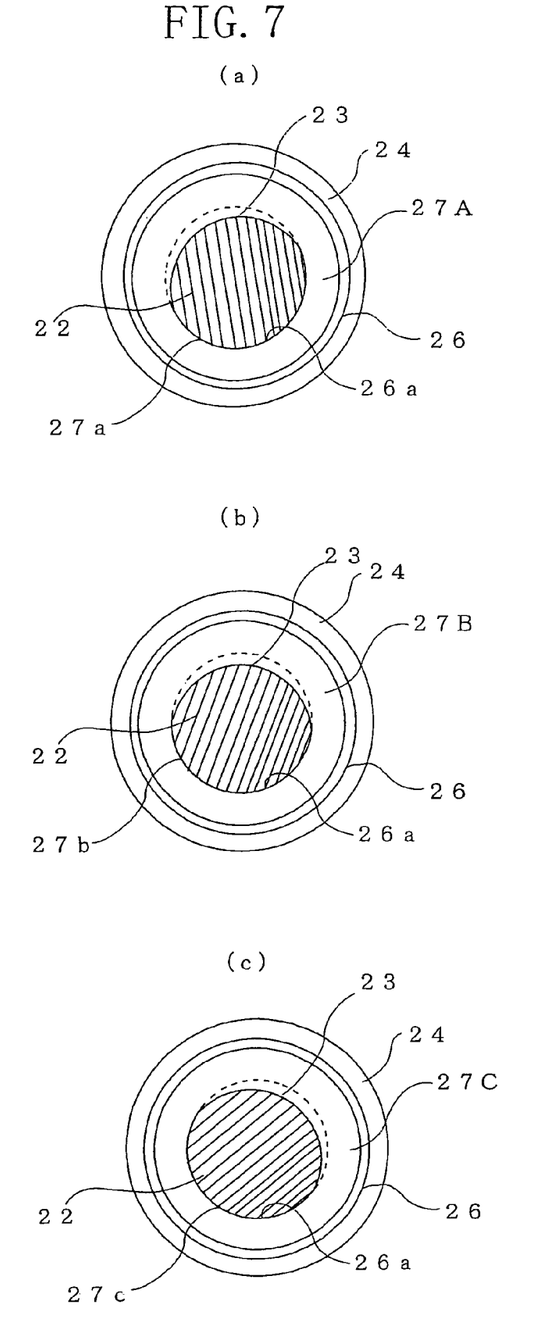
FIG. 7 is a cross-sectional view illustrating the relationship between each of thin seal plates 27A, 27B, and 27C and a ball screw shaft 22 of FIG. 4.

This embodiment of the ball screw lubricative sealing device 20 includes: generally cylindrical case members 24 that is connected to both ends 21a of a screw nut 21 using fastening bolts (having a head with a hexagonal hole) 25 and screw holes 21b formed in both ends 21a of the screw nut 21, which are threadably engaged with a ball screw shaft 22 having a helical groove 23, with rolling elements such as steel balls (not shown) interposed therebetween; a thin cap 26 having a hole 26a which is large enough to allow the ball screw shaft 22 to extend through and being fixedly set in a seal accommodating hole 24a of each of the case members 24;

three thin seal plates 27A, 27B, and 27C having holes 27a, 27b, and 27c that match the lateral cross-sectional shape of the helical groove 23 of the ball screw shaft 22 and being overlapped in a circumferentially displaced manner and set in the thin cap 26 as shown in FIG. 6 and FIG. 7; and a grease reservoir space 28 formed inside each of the case members 24 between the three thin seal plates 27A, 27B, and 27C and the end 21a of the screw nut 21.

The outer circumferential surfaces of the three overlapped thin seal plates 27A, 27B, and 27C and the inner circumferential surface of the thin cap 26 have substantially the same area, and they are fixed to each other using an adhesive. The fiber material made of three-dimensionally crosslinked plastic fiber and resilient rubber members, which forms the three thin seal plates 27A, 27B, and 27C, is obtained by adhering molten rubber on the surfaces of thin polyester plastic fibers, and the integrated fiber material has a multiplicity of spaces between the fibers. These spaces are filled with a lubricant such as a grease to form a lubricant supply unit. Polyester resin is effectively used as the base resin of the plastic fiber, but the material is not limited to this.

Each of the case members 24 is generally cylindrical and has the same size as the outer shape of the end 21a of the screw nut 21. On the inner side next to the seal accommodating hole 24a is formed a hole 24b with a smaller diameter, and in the bottom of this hole, a hole 24c is formed which is large enough to allow the screw shaft 22 to extend through. Reference numeral 29 in the drawing shows a screw that plugs an opening 24f for supplying a lubricant such as grease into the grease reservoir space 28.

Figure 5:
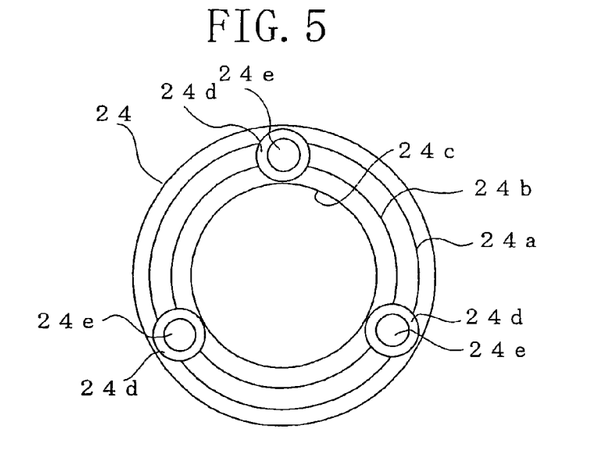
FIG. 5 is a front view of the case member of FIG. 4.

As shown in FIG. 5, each of the case members 24 further includes deep spot face holes 24d at three equally distanced locations from the side of the hole 24a to as far as near the other end face 24g, and concentric holes 24e that are bored from the bottom of these spot face holes, to form the mounting holes for the fastening bolts 25.

Next, the mechanism of the thus structured ball screw lubricative sealing device 20 according to the embodiment will be described.

Referring to FIG. 4 and FIG. 6, first, the three lubricant-impregnated thin seal plates 27A, 27B, and 27C are circumferentially displaced and overlapped in the thin cap 26 and fixed in the thin cap 26 using an adhesive, after which the thin cap is set in the seal accommodating hole 24a of each of the case members 24 and fixed using an adhesive.

Next, three fastening bolts 25 are set in the holes 24d and 24e at three locations of each of the case members 24, to secure the case members 24 to both ends 21a of the screw nut 21.

Next, the ball screw shaft 22 is inserted into the hole 26a of the thin cap 26 and the holes 27a, 27b, and 27c of the three thin seal plates 27A, 27B, and 27C.

Thereby, the hole 26a of the thin cap 26 and the holes 27a, 27b, and 27c of the three thin seal plates 27A, 27B, and 27C make contact with the screw groove 23 of the ball screw shaft 22, as shown in FIG. 7.

The holes 27a, 27b, and 27c of the three thin seal plates 27A, 27B, and 27C make pressure contact with the surface of the screw groove 23 of the ball screw shaft 22 because of the resiliency of the resilient rubber member, whereby the thin seal plates provide lubricating effect for a longer time as compared to known felt materials.

Further, the thin cap 26 located inside the seal accommodating hole 24a of each of the case members 24 removes most of the contaminants from outside. Small contaminants that have passed through the thin cap 26 and proceed further inside are caught and kept in the interspaces between the fibers of the three thin seal plates 27A, 27B, and 27C. Entrance of contaminants from outside is thus prevented reliably.

As described above, with the ball screw lubricative sealing device 20 according to this embodiment, effective lubrication is achieved without any mechanism for applying pressure from an outer circumferential side as with the conventional device.

Moreover, the ball screw lubricative sealing device 20 according to this embodiment can be attached to the screw nut 21 by providing the screw holes 21b at the ends 21a of the screw nut 21, and an end cover or the like need not be attached to the end faces of the screw nut 21.

While the three thin seal plates 27A, 27B, and 27C used in the above-described embodiment are preliminarily impregnated with a lubricating oil, this is not a requirement of the present invention and the thin seal plates 27A, 27B, and 27C may be impregnated with a lubricating oil after they are fixedly set inside the thin cap 26.

Also, while three thin seal plates 27A, 27B, and 27C are used in the above-described embodiment, this is not a requirement of the present invention and the number of thin seal plates may be suitably selected according to needs.

Further, while the ball screw shaft 22 has a single-thread screw groove 23 in the above-described embodiment, this is not a requirement of the present invention and the screw shaft may have any number of threads.

Third Embodiment

Figure 8:
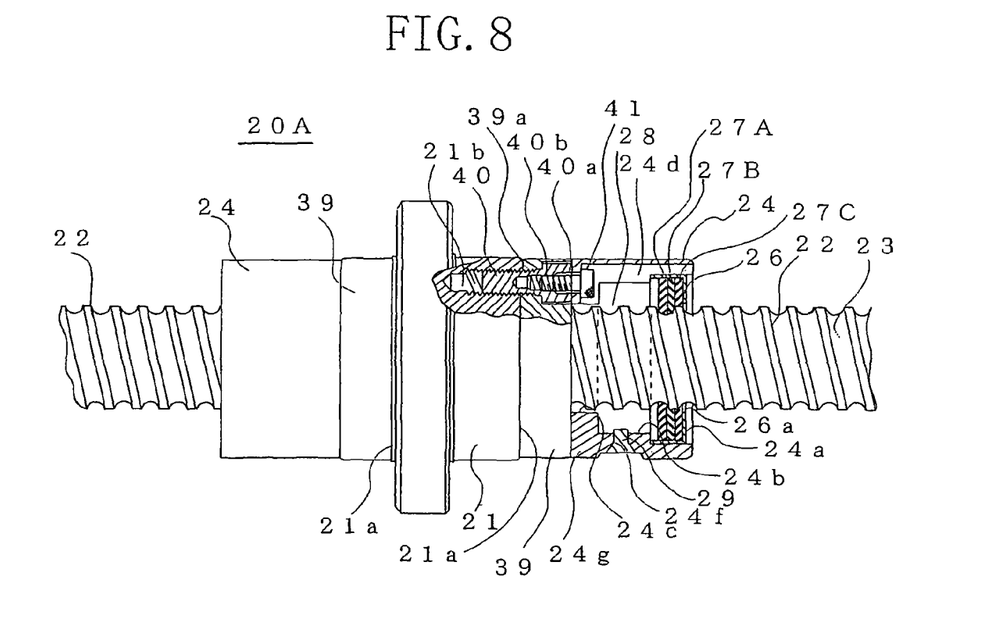
FIG. 8 is a partially cut-away side view of a ball screw lubricative sealing device according to the third embodiment of the present invention.
Figure 9:
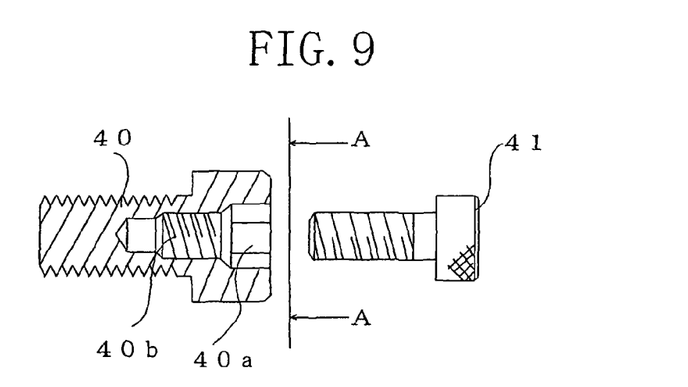
FIG. 9 is an exploded cross-sectional view illustrating how the mounting screw of FIG. 8 is connected.
Figure 10:
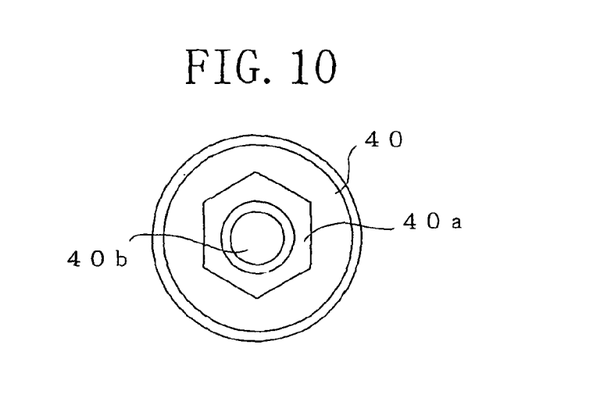
FIG. 10 is a cross section taken along the line A-A in FIG. 9.

FIG. 8 to FIG. 10 illustrate a ball screw lubricative sealing device 20A according to a third embodiment of the present invention.

The ball screw lubricative sealing device 20A according to this third embodiment is different from the ball screw lubricative sealing device 20 according to the second embodiment in that end caps 39 is provided to both ends 21a of the screw nut 21 and the case members 24 are attached to these end caps 39.

Therefore, the same elements as those of the ball screw lubricative sealing device 20 according to the second embodiment are given the same reference numerals and will not be described again.

Each of the end caps 39 is provided with screw holes 39a that are coaxial with the screw holes 21b of the screw nut 21. Fastening bolts 40 are set in the screw holes 39a. Each of the fastening bolts 40 has a head with a hexagonal hole as shown in FIG. 9 and FIG. 10 and includes a coaxial screw hole 40b bored in the bottom of the hexagonal hole 40a. Not to mention, this screw hole 40b has a smaller diameter than the inner circle diameter of the hexagonal hole 40a. While the screw hole has a bottom as it is bored only partway in the illustrated example, the screw hole may extend through to the bottom, or, the screw hole may be bored partway and connected to a clear hole that extends through to the bottom.

Each of the case members 24 is secured to the end cap 39 using mounting screws (bolts with a head having a hexagonal hole) 41 having a screw part that engages with the screw holes 40b.

Next, the mechanism of the thus structured ball screw lubricative sealing device 20A according to the embodiment will be described.

First, the end caps 39 are attached to both ends 21a of the screw nut 21 by the fastening bolts 40 set in the screw holes 39a.

Next, as with the second embodiment, the lubricant-impregnated three thin seal plates 27A, 27B, and 27C are circumferentially displaced and overlapped in the thin cap 26, and fixed in the thin cap 26 using an adhesive, after which the thin cap is set into the seal accommodating hole 24a of each of the case members 24 and fixedly attached using an adhesive.

Next, three mounting screws 41 are set in the screw holes 40b of the fastening bolts 40 through the holes 24d and 24e formed at three locations of each of the case members 24, to secure the case members 24 to both ends 21a of the screw nut 21.

Next, the ball screw shaft 22 is inserted into the hole 26a of the thin cap 26 and the holes 27a, 27b, and 27c of the three thin seal plates 27A, 27B, and 27C.

Thereby, the hole 26a of the thin cap 26 and the holes 27a, 27b, and 27c of the three thin seal plates 27A, 27B, and 27C make contact with the screw groove 23 of the ball screw shaft 22, as shown in FIG. 7.

The holes 27a, 27b, and 27c of the three thin seal plates 27A, 27B, and 27C make pressure contact with the surface of the screw groove 23 of the ball screw shaft 22 because of the resiliency of the resilient rubber member, whereby the thin seal plates provide lubricating effect for a longer time as compared to known felt materials.

Further, the thin cap 26 located inside the seal accommodating hole 24a of each of the case members 24 removes most of the contaminants from outside. Small contaminants that have passed through the thin cap 26 and proceed further inside are caught and kept in the interspaces between the fibers of the three thin seal plates 27A, 27B, and 27C. Entrance of contaminants from outside is thus prevented reliably.

As described above, with the ball screw lubricative sealing device 20A according to this embodiment, the device can be attached to the ball screw after the ball screw has been assembled. Therefore, the ball screw and the lubricative sealing device can be assembled separately, which improves work efficiency and enables simple attachment of the lubricative sealing device even after making adjustments to the assembled ball screw. This prevents accuracy deterioration of the ball screw, prevents deterioration of ball circulation performance that is caused by disassembling or the like, and eliminates the need of re-adjustments after the disassembling.

While this embodiment uses the end caps 39, this is not a requirement of the present invention, and an end cover may also be used.

Further, each of the mounting screws 41 need not necessarily have a head with a hexagonal hole, and hexagonal bolts and any other screws may be used.

Furthermore, a plastic wiper, a lip seal, or the like may be set in the seal accommodating hole 24a of the case member 24 that is located outside and slightly spaced from the plurality of thin seal plates 27A, 27B, and 27C fitted in the thin cap 26 that is fixedly set inside each of the case members 24, to prevent entrance of contaminants from outside or grease leakage from inside.

The invention is not limited to the above embodiments and various modifications may be made without departing from the spirit and scope of the invention. Any improvement may be made in part or all of the components.

What is claimed is:

1. A ball screw lubricative sealing device comprising:
   generally cylindrical case members having attachment parts to be attached to both ends of a screw nut, respectively;
   a plurality of thin seal plates having a hole each and fitted inside each of the case members, the thin seal plates being displaced in respective circumferential directions and stacked together, and
   a plastic wiper in a discoid shape, having a hole, and fitted with a space from the thin seal plates inside each of the case members to which the thin seal plates are fitted, wherein
   the hole of each of the thin seal plates and the hole of the plastic wiper each has a shape corresponding to a lateral cross-sectional shape of a screw groove of a ball screw shaft,
   the case members are each provided with a groove for fitting the thin seal plates, an annular projection for forming the space, and a groove for fitting the plastic wiper,
   outer circumferential surfaces of the thin seal plates are bonded to an inner circumferential surface of the groove using an adhesive; and
   the plurality of thin seal plates are impregnated with a lubricant and comprise resilient rubber material penetrated into surfaces of thin polyester plastic fibers.

2. The ball screw lubricative sealing device according to claim 1, wherein the lubricant is impregnated into each of the thin seal plates after the thin seal plates being displaced in the respective circumferential directions and stacked together are inserted and fixed inside each of the case members.

3. The ball screw lubricative sealing device according to claim 1, wherein the plurality of thin seal plates are configured to form a lubricant supply device by impregnating the lubricant into multiple spaces formed among the thin polyester plastic fibers.

* * * * *